United States Patent
Leger (10) Patent No.: US 11,907,918 B2
(45) Date of Patent: Feb. 20, 2024

(54) METHOD FOR CARRYING OUT A TRANSACTION, CORRESPONDING TERMINAL AND COMPUTER PROGRAM

(71) Applicant: Banks and Acquirers International Holding, Paris (FR)

(72) Inventor: Michel Leger, Saint-Germain-en-Laye (FR)

(73) Assignee: BANKS AND ACQUIRERS INTERNATIONAL HOLDING, Paris (FR)

(*) Notice: Subject to any disclaimer, the term of this patent is extended or adjusted under 35 U.S.C. 154(b) by 1076 days.

(21) Appl. No.: 14/329,395

(22) Filed: Jul. 11, 2014

(65) Prior Publication Data

US 2015/0019433 A1 Jan. 15, 2015

(30) Foreign Application Priority Data

Jul. 11, 2013 (FR) ........................................ 1356839
Dec. 20, 2013 (FR) ........................................ 1363300

(51) Int. Cl.
| | | |
|---|---|---|
| *G06Q 20/02* | (2012.01) | |
| *G06Q 20/08* | (2012.01) | |
| *G06Q 20/20* | (2012.01) | |
| *G06Q 20/32* | (2012.01) | |

(52) U.S. Cl.
CPC .......... *G06Q 20/085* (2013.01); *G06Q 20/02* (2013.01); *G06Q 20/20* (2013.01); *G06Q 20/322* (2013.01)

(58) Field of Classification Search
None
See application file for complete search history.

(56) References Cited

U.S. PATENT DOCUMENTS

| | | | | |
|---|---|---|---|---|
| 6,282,522 | B1* | 8/2001 | Davis | G06Q 20/40 705/41 |
| 7,103,575 | B1* | 9/2006 | Linehan | G06Q 30/0601 705/26.1 |
| 7,991,694 | B2* | 8/2011 | Takayama | G06Q 20/363 705/41 |

(Continued)

FOREIGN PATENT DOCUMENTS

| | | |
|---|---|---|
| EP | 2128809 A1 | 12/2009 |
| WO | 0163375 A2 | 8/2001 |
| WO | 200600021 A1 | 1/2006 |

OTHER PUBLICATIONS

Title: Secure Mobile Payment via Trusted Computing Authors: Qi Li et al. Published in: 2008 Third Asia-Pacific Trusted Infrastructure Technologies Conference (pp. 98-112) (Year: 2008).*

(Continued)

*Primary Examiner* — Christopher Bridges
*Assistant Examiner* — Yongsik Park
(74) *Attorney, Agent, or Firm* — David D. Brush; Westman, Champlin & Koehler, P.A.

(57) ABSTRACT

A method is provided for carrying out a financial transaction. The method is implemented within a terminal of a user wishing to carry out a transaction with a merchant. The method includes: receiving a merchant's identifier; receiving a piece of data representing a transaction amount; generating a transaction by using the user's terminal to the benefit of the merchant; and transmitting the transaction to a transaction management server.

10 Claims, 2 Drawing Sheets

(56) References Cited

U.S. PATENT DOCUMENTS

| | | | | |
|---|---|---|---|---|
| 8,219,469 B2* | 7/2012 | Naccache | G06Q 20/20 | 705/16 |
| 8,364,552 B2* | 1/2013 | Ciurea | G06Q 20/3224 | 705/26.1 |
| 8,700,729 B2* | 4/2014 | Dua | G06Q 20/3674 | 705/64 |
| 9,185,539 B2* | 11/2015 | Krampe | G06Q 20/3263 | |
| 9,471,918 B1* | 10/2016 | Krampe | G06Q 20/18 | |
| 2002/0107791 A1* | 8/2002 | Nobrega | G06Q 20/322 | 705/39 |
| 2002/0116329 A1* | 8/2002 | Serbetcioglu | G06Q 20/04 | 705/39 |
| 2003/0105725 A1* | 6/2003 | Hoffman | G06Q 20/40 | 705/50 |
| 2005/0203765 A1* | 9/2005 | Maritzen | G06Q 30/00 | 705/26.1 |
| 2006/0165060 A1* | 7/2006 | Dua | G06Q 20/401 | 705/76 |
| 2006/0224470 A1* | 10/2006 | Garcia Ruano | G06Q 20/102 | 705/40 |
| 2008/0103912 A1* | 5/2008 | Naccache | G06Q 40/12 | 705/16 |
| 2009/0030843 A1* | 1/2009 | Hoffman | G07F 7/1008 | 705/67 |
| 2009/0125323 A1* | 5/2009 | Lakshmanan | G06Q 30/0601 | 705/26.1 |
| 2009/0125429 A1* | 5/2009 | Takayama | G06Q 20/327 | 705/35 |
| 2009/0298427 A1* | 12/2009 | Wilkinson | G06Q 20/3227 | 709/204 |
| 2011/0258075 A1* | 10/2011 | Ciurea | G06Q 30/06 | 705/26.41 |
| 2011/0258121 A1* | 10/2011 | Kauniskangas | G06Q 20/306 | 705/67 |
| 2012/0136798 A1* | 5/2012 | Navar | G06Q 20/3829 | 705/27.1 |
| 2013/0073464 A1* | 3/2013 | Magpayo | G06Q 30/0256 | 705/44 |
| 2013/0073859 A1* | 3/2013 | Carlson | H04L 9/3247 | 713/176 |
| 2013/0117184 A1* | 5/2013 | Ciurea | G06Q 20/20 | 705/44 |
| 2013/0246203 A1* | 9/2013 | Laracey | G06Q 30/06 | 705/40 |
| 2013/0304648 A1* | 11/2013 | O'Connell | G07C 9/10 | 705/44 |
| 2014/0074637 A1* | 3/2014 | Hammad | G06Q 20/326 | 705/41 |
| 2014/0108241 A1* | 4/2014 | Tunnell | G06Q 20/321 | 705/41 |
| 2014/0114857 A1* | 4/2014 | Griggs | G06Q 40/00 | 705/44 |
| 2014/0162598 A1* | 6/2014 | Villa-Real | G07F 7/0886 | 455/411 |
| 2014/0222599 A1* | 8/2014 | Wang | G06Q 20/325 | 705/39 |
| 2014/0229339 A1* | 8/2014 | Massiere | G06Q 20/40 | 705/26.81 |
| 2014/0330721 A1* | 11/2014 | Wang | G06Q 20/40 | 705/44 |
| 2014/0337205 A1* | 11/2014 | Tavares | G06Q 20/385 | 705/39 |
| 2015/0006390 A1* | 1/2015 | Aissi | G06Q 20/40 | 705/44 |
| 2017/0004462 A1* | 1/2017 | Quentin | G06Q 20/02 | |

OTHER PUBLICATIONS

French Search Report dated Feb. 19, 2014 for corresponding French Application No. 1356839, filed Jul. 11, 2013.

French Search Report dated Jul. 1, 2014 for corresponding French Application No. 1363300, filed Dec. 20, 2013.

Examiner Requisition dated Dec. 10, 2021 from corresponding Canadian Application No. 2,856,282, filed Jul. 8, 2014.

* cited by examiner

METHOD FOR CARRYING OUT A TRANSACTION, CORRESPONDING TERMINAL AND COMPUTER PROGRAM

1. FIELD OF THE INVENTION

The invention pertains to the field of payment instruments. More particularly, the invention pertains to a novel payment instrument.

2. PRIOR ART

The history of payment is relatively old. Ever since money has existed, the way in which it can be exchanged to make a payment has been a central preoccupation. Numerous payment instruments have thus been created: cash to begin with and then exchange and credit instruments such as bills of exchange, checks, etc. More recently, bankcards have gradually revolutionized the way in which payments are made. This revolution relates chiefly to the miniaturization and processing capacities of processors.

We have indeed moved on from the use of simple magnetic-stripe cards containing data but incapable of processing information to smartcards comprising processors and memory.

By contrast, the principles of payment in themselves have undergone relatively little development as compared with the progress of the techniques implemented to make these payments. Thus, for payment by bankcard, the user has a card and the merchant has a payment terminal used to read the data in the card and verify the cardholder's identity (or at least to ascertain that the cardholder has knowledge of the information enabling the payment to be validated). Although the techniques of identification, recognition and card detection have made progress, it is still necessary for the user to have a bank identifier which he presents to the merchant, who is responsible for having the necessary infrastructures available to authenticate the user and put the transactions through with the appropriate banking services. Now, these infrastructures are, on the one hand, costly and, on the other hand, comprise extremely sensitive data such as bank identifiers "of all the users of this terminal". The compromising of this information can have consequences substantially more serious than those related to the unauthorized use of the banking data of only one customer (for example through a theft of a bankcard number). To try and obtain protection from such compromising of information or theft on the merchant's side, the terminals used by these merchants are increasingly sophisticated and buttressed with security measures. Now even though these measures are efficient, it is nevertheless a fact that there are always flaws.

It is therefore necessary to propose solutions that enable the resolution of these problems related to the risk of compromising the merchant's data.

3. SUMMARY OF THE INVENTION

The invention does not have these drawbacks of the prior art. Indeed, the invention relates to a method for carrying out a financial transaction, implemented within a terminal of a user wishing to carry out a transaction with a merchant. According to the invention, such a method comprises:
 a step for receiving a merchant's identifier;
 a step for receiving a piece of data representing a transaction amount;
 a step for generating a transaction by means of the user's terminal for said merchant;
 a step for transmitting said transaction to a transaction management server.

Thus, the proposed technique enables the management of the transaction directly within the customer's terminal. It is therefore not necessary to provide the merchant with the user's private identifiers. Since these identifiers are not given to the merchant, there is no risk that any compromising of the merchant's device would lead to a compromising of the customer's data. Conversely, there is no risk that the merchant will be compromised by the customer's device.

According to one particular characteristic, said step for generating said transaction comprises a step for the entry, by said user, of at least one piece of data representing a personal securing identifier.

Thus, unlike in other techniques, the technique of the invention ensures that the transaction (hence the payment) is done in "card present" mode, i.e. as if the bankcard had been inserted into the merchant's terminal.

According to one particular characteristic, said method comprises, subsequently to said step for transmitting, a step for receiving a piece of data representing a validation of said transaction coming from a terminal of said merchant.

According to one particular embodiment, said step for receiving a merchant's identifier comprises a phase of pairing with a terminal of said merchant comprising a step for obtaining said piece of data representing the merchant's identifier.

According to one particular embodiment, said step for receiving a merchant's identifier comprises a phase of reading a barcode comprising a piece of data representing the merchant's identifier.

According to one particular embodiment, said step for receiving a merchant's identifier comprises a step for receiving a piece of data representing the merchant's identifier from a remote server.

According to one particular embodiment, said step for generating a transaction comprises:
 a step for creating a specific recording comprising said merchant's identifier, said piece of data representing a transaction amount and a piece of data representing an identifier of the user;
 a step for encrypting said recording by means of said terminal of said user delivering said transaction.

According to another embodiment, the invention also relates to a method for building data representing a financial transaction, a device implemented within a terminal of a user wishing to carry out a transaction with a merchant, the device being characterized in that it comprises:
 means for receiving a merchant's identifier;
 means for receiving a piece of data representing a transaction amount;
 means for generating a transaction, by means of the user's terminal, for said merchant;
 means for transmitting said transaction to a transaction management server.

The invention also relates, in its version complementary to the method described here above, to a method for processing transactional data by means of a transaction management server connected to a communications network. According to the invention, such a method comprises:
 a step for receiving a transaction from a users terminal, the transaction comprising a piece of data representing a merchant's identifier, a piece of data representing a transaction amount and/or a piece of data representing an identifier of said user;
 a step for verifying the validity of said transaction;

a step for implementing a credit operation, on an account associated with said identifier of said merchant, as a function of said piece of data representing a transaction amount;

a step for implementing a debit operation, on an account associated with said identifier of said user, as a function of said piece of data representing a transaction amount;

a step for transmitting an assertion of validation of said transaction to said merchant.

The invention also relates to a transaction management server comprising means for implementing the steps described here above.

According to one particular characteristic, the invention also relates to a two-dimensional code, called a QR code. According to the invention, such a QR code is differentiated from the prior art by the fact that it comprises, on the one hand, a merchant's identifier and, on the other hand, an identifier relating to a transaction price. According to one particular characteristic, depending on the embodiments, such a code also comprises a product and/or service identifier. Such a code can also include a location of the sale of a product or service. In an alternative version, such a code can also include an address get connected to in order to obtain said pieces of data.

According to a preferred embodiment, the different steps of the methods according to the invention are implemented by one or more software programs or computer programs comprising software instructions intended for execution by a data processor of a relay module according to the invention in being designed to command the execution of the different steps of the method.

As a consequence, the invention also concerns a program that can be executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other requisite form whatsoever.

The invention also relates to an information carrier readable by a data processor and comprising the instructions of a program as mentioned here above.

The information carrier can be any entity or device whatsoever capable of storing the program. For example, the carrier can comprise a storage means such as a ROM for example, a CD ROM or a microelectronic circuit ROM or again a magnetic recording means, for example a floppy disk or a hard disk drive.

Besides, the information carrier can be a transmissible carrier such as an electrical or optical signal which can be conveyed via an electrical or optical cable, radio or other means. The program according to the invention can in particular be downloaded on to an Internet type network.

As an alternative, the information carrier can be an integrated circuit into which the program is incorporated, the circuit being adapted to executing or being used to execute the method in question.

According to one embodiment, the invention is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a software program capable of implementing a function or a set of functions according to what is described here below for the module concerned. Such a software component is executed by a data processor of a physical entity (terminal, server, gateway, router, etc) and is capable of accessing the hardware resources of this physical entity (memories, recording media, communications buses, input/output electronic boards, user interfaces, etc).

In the same way, a hardware component corresponds to any element of a hardware assembly capable of implementing a function or a set of functions according to what has been described above for the module concerned. It may be a programmable hardware component or a component with an integrated processor for the execution of the software, for example an integrated circuit, a smartcard, a memory card, an electronic card for executing firmware, etc.

Each component of the system described here above of course implements its own software modules.

The different embodiments mentioned here above can be combined with one another to implement the invention.

4. LIST OF FIGURES

Other features and advantages of the invention shall appear more clearly from the following description of a preferred embodiment given by way of a simple illustratory and non-exhaustive example and from the appended drawings, of which.

5. DESCRIPTION

5.1. Reminder of the General Principle of the Invention

The general principle of the invention is based on a paradigm reversal as regards payment. More particularly, payment by a bank smartcard (or contactless card or telephone with payment function) as commonly done implies that the merchant with whom the payment is being made or is to be made has a specific apparatus enabling the payment to be made. This also implies that the customer provides a terminal identifier (using a bankcard [smartcard, magnetic stripe card, contactless card]) and that the merchant is responsible for authenticating the customer according to the hardware presented to him by the customer.

In the proposed technique, a terminal in the customers possession (the terminal can be a telephone, a Smartphone, a PDA, a tablet, a laptop or any other device capable of managing a transaction) is used to generate and transmit the financial transaction to a transaction management server (such as a bank server or a payment service provider for example). The merchant no longer uses the customer's particulars. Conversely, the customer uses the merchant's particulars.

This has numerous advantages, among them the assurance that the customer's data will not be stolen or compromised. Indeed, inasmuch the merchant's data is considered to be public data and the financial operation is considered to be an operation intended for the merchant (a credit operation for the merchant), the merchant does not need to give his assent in order to receive credit from the user. The merchant's data is therefore not compromised. In addition, since the customer does not give his own data to the merchant, the proposed method makes sure that the customer's data will not be exploited against his consent (by theft, misuse of identity, etc). Thus, neither the merchant nor the customer supply sensitive data. Besides, the proposed technique has the advantage of using structures existing with the merchant. Indeed, as a rule, the merchant already has a terminal used to receive data from one or more bank servers. The advantage of the proposed method is that the merchant's terminal is not responsible for building the transaction and that all he has to do is to receive data from a server (and/or from another terminal).

Here below, an embodiment of the invention is presented in which the principle presented is implemented. It is understood that the description of the implementation of the proposed principle is not exhaustive and that any other method implementing the principle comes within the framework of the present disclosure.

5.2. Description of One Embodiment

In this embodiment, a description is provided of a method enabling a customer to carry out a financial transaction (for example a purchase) with a merchant. The system described has the huge advantage on the one hand of making use of existing structures and, on the other hand, of making sure that the transaction is carried out in "card present" mode, since the technique in this embodiment requires the entry by the user of a piece of data representing a personal securing identifier (for example a PIN code). This PIN code is associated, as desired, either with a payment card dissociated from the user's terminal or directly with the user's terminal itself (when this terminal comprises for example a payment card or a payment module integrated into the terminal).

Figure 1:
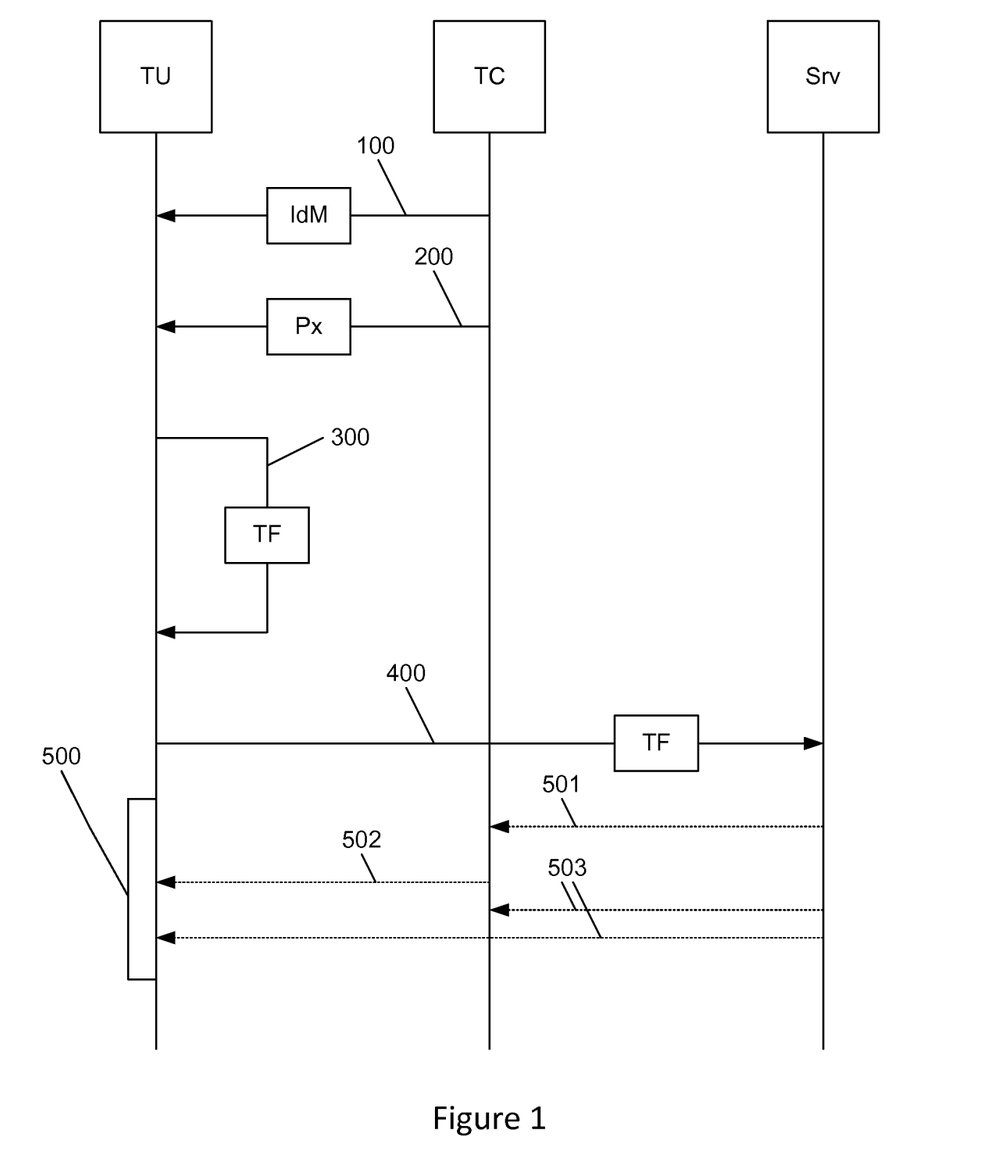
FIG. 1 is a block diagram of the proposed technique.

In this embodiment, the method comprises the following steps in a terminal held by a user (TU) wishing to make a financial transaction with a merchant (who possesses a device that can be taken to be a merchant's terminal (TC) which comprises, as the case may be, reduced functions):
- a step (100) for receiving a merchant's identifier (IdM);
- a step (200) for obtaining/receiving a piece of data representing a transaction amount (Px);
- a step (300) for generating, by means of the user's terminal and for said merchant, a transaction (TF) intended for a transaction management server (Srv);
- a step (400) for transmitting said transaction (TF) to said transaction server (Srv).

The reception of the merchant's identifier and of the price identifier is subsequent either to the direct transmission of this data from the merchant's terminal to the customers terminal or subsequent to an indirect transmission, involving the transaction management server. In this case, it is the transaction management server that directly transmits this data to the user's terminal TU. In this second example, the user is already connected to the transaction management server and validates the transaction with this server, for example following the entry of a PIN code by the user: the step for generating the transaction then comprises the entry of a PIN code by the user (as explained here above) and the transaction is transmitted to the server. Thus, the transaction (TF) transmitted to the server can, in this embodiment, be only a confirmation (it is for example a confirmation in the form of a transaction hash, said hash being built from the merchant's identifier, the price identifier and the customer's identifier).

Thus, the merchant furnishes, so to speak, a "public" identifier with which he wishes that the transaction, for which the customer's terminal is responsible, should be settled. In a complementary embodiment of the invention, the identifier given by the merchant enables only the carrying out of credit transactions towards an account opened for the merchant.

Once the transaction has been transmitted to the transaction management server (bank server or server of a payment service provider), this transaction is validated (500). This validation can take several distinct forms: either a transmission (501) to the merchant's terminal (TC) which retransmits to the customer's terminal (502). It can also be a direct transmission, by the transaction management server, to the two terminals (this makes it possible to prevent suspicion of fraud which can burden the transaction): the transaction management server then plays a role of a trustworthy third party for the performance of the transaction. Naturally, this validation is not limited solely to the steps for transmission to the terminals as shall be explained here below.

Depending on the embodiments of the proposed technique, receiving the identifier from the merchant can comprise one (or more) of the following phases:
- a phase for pairing, for example by using the Bluetooth protocol, comprising the obtaining of a piece of data representing the merchant's identifier;
- a phase for reading a barcode, for example a 2D barcode, comprising a piece of data representing the merchant's identifier;
- a step for receiving, from a remote server, a piece of data representing the merchant's identifier: it can for example be a server linked to a franchise or to a transaction management server;
- in one particular embodiment, the identifier is obtained by decryption of a barcode, for example a 2D barcode (or Bluetooth pairing) delivering an address at which the user's terminal can obtain a merchant's identifier;
- the reception of this identifier can also be carried out by a contactless card which, when brought close to the user's terminal, delivers the merchant's identifier. The reception of this identifier can also be done by a mobile terminal in the possession of the merchant himself who exchanges data with the user's terminal.

Depending on the embodiments of the proposed technique, obtaining a piece of data representing a transaction amount can include one (or more) of the following phases:
- an entry by the user himself of the amount of the transaction;
- a pairing phase, for example using the Bluetooth protocol, comprising the obtaining of a piece of data representing a transaction amount;
- a step for reading a barcode, for example a 2D barcode, comprising a transaction amount;
- a step for receiving, from a remote server, a piece of data representing a transaction amount: it may be for example a server linked to a franchise or a transaction management server;
- in one particular embodiment, the identifier is obtained by decrypting a barcode, for example a 2D barcode (or Bluetooth pairing) delivering an address from which the terminal of the user can obtain a transaction amount.

Depending on the embodiments, the preceding steps for receiving can be combined into one and the same step.

When the data on to the merchant and the price are available to the terminal, it generates the transaction. To this end, several possibilities can be envisaged. A first possibility is that of using a particular application to generate a specific recording comprising on the one hand the data obtained previously and an identifier of the user. As an accessory this recording can be encrypted in order to guarantee the integrity of the data that will be conveyed.

During this generation, the user's PIN code is required, by means of a specific PIN code entry application, which requires an entry action on the part of the user. This can be done by means of a physical keyboard or a touch keyboard. The transaction is therefore done in "card present" mode.

In the following step, the recording is transmitted from the customer's terminal to a transactional server (transaction management server). The transactional server (which is advantageously a server of a payment services supplier or a bank server) then validates the transaction.

The validation of the transaction can include a certain number of steps, among them a step for debiting an account of the user and a step for crediting an account of the merchant.

In one specific embodiment, in addition to these two steps (debit/credit), the validation of the transaction by the transaction management server comprises preliminarily:
- a step for transmitting at least one piece of data to a terminal in the merchant's possession, this piece of data representing the transaction so that the merchant can make sure of the amount of the transaction and validate it (in this case there is a step of validation by the merchant);
- a step for receiving a piece of data from a terminal in the customer's/user's possession, this piece of data representing a validation of the transaction by said merchant.

Depending on the embodiments, the piece of data representing the transaction received by the merchant can comprise:
- a piece of data representing the amount of the transaction;
- a piece of data representing the terminal used by said user to carry out the transaction, for example the brand of the terminal;
- a piece of data representing the payment establishment selected by the user to carry out the transaction for the benefit of the merchant.

When the merchant's terminal (TC) validates the transaction, for example by pressing a validation key on the merchant's terminal, the customer's terminal (TU) receives a piece of data, from the merchant's terminal (TC) (for example if a Bluetooth connection has been built) or from the transactional server (Serv), this piece of data representing the validation of the transaction. At the same time, the transactional server executes the necessary debit and credit operations.

5.3. Other Features and Advantages

Figure 2:
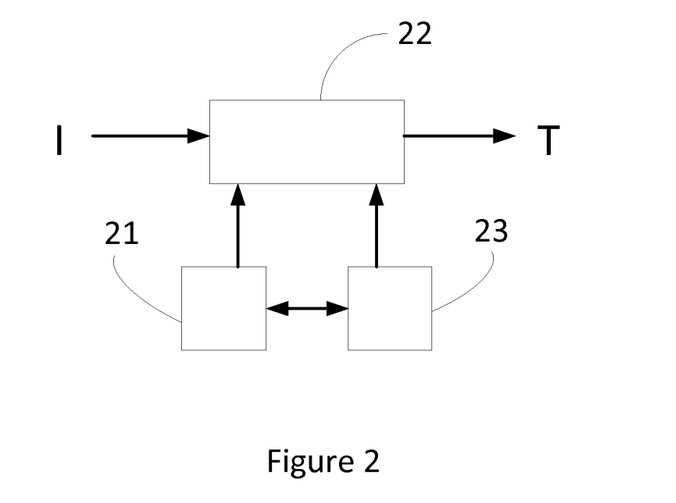
FIG. 2 describes a device for implementing the proposed technique.

Referring to FIG. 2, a description is provided of a user terminal implemented to carry out the transactions according to the method described here above.

For example, the terminal comprises a memory 21 constituted by a buffer memory, a processing unit 22 equipped for example with a microprocessor and driven by the computer program 23 implementing a method for building data representing a transaction.

At initialization, the code instructions of the computer code 23 are for example loaded into a memory and then executed by the processor of the processing unit 22. The processing unit 22 inputs at least one piece of data representing a merchant's identifier and one piece of data representing a transaction amount. The microprocessor of the processing unit 22 implements the steps of the method for building data representing transactions, according to the instructions of the computer program 23 to carry out a validation of transaction.

To this end, the device comprises, in addition to the buffer memory 21, means of communications such as network communications modules, data transmission modules and if necessary an encryption processor.

In one particular embodiment of the invention, the user's terminal, which can be a Smartphone, a tablet, a portable computer or a PDA, integrates transaction management means such as those described here above. These means can take the form of a particular processor implemented within the terminal, said processor being a secured processor. According to one particular embodiment, this terminal implements a particular application which is responsible for managing transactions, this application being for example provided by the manufacturer of the processor in question in order to enable the use of said processor. To this end, the processor comprises unique identification means. These unique identification means can be used to make sure of the authenticity of the processor.

In another embodiment, the management application installed in the terminal also comprises unique identification means used either to make sure of the authenticity of the application or to ensure the identification of the holder of the terminal, or both.

5.4. Generation of Invoicing Data

The technique described also relates to the generation and representation of data intended for the user's terminal (merchant's identifier and price identifier). As explained here above, this generation and this representation can be recorded in the context of a physical payment made with a physical merchant.

The data can for example be represented in the form of a 2D code, such as the QR code. The data can also be represented by other types of code.

More particularly, in one embodiment, the pieces of data are printed out on paper, for example by means of a terminal (a payment terminal having a printer for example) at the merchant's disposal. These pieces of data are then read by the camera of the user's terminal. They are decoded, then interpreted to generate the transaction to the merchant's benefit as described here above.

In another embodiment, the pieces of data are displayed, again in the form of a 2D code, on the screen of a terminal (for example the merchant's payment terminal, or a smart cash register) at the merchant's disposal. These pieces of data are then read by the camera of the user's terminal. They are decoded and then interpreted to generate the transaction to the merchant's benefit as described here above.

According to the circumstances and parameters of implementation, the acquisition of the data can be done in two steps: the first step for acquiring the merchant's identity, and the second for acquiring the amount of the transaction. These two steps can also be merged into one and the same acquisition step, as explained here above.

5.5. Case of Use

The technique described can be applied to numerous different situations of daily life. It simplifies relationships between customers and consumers while at the same time ensuring minimum data exchange.

For example, the method of the invention can be applied to the online payment for goods or services from a computer:

instead of requesting a payment by "classic" bankcard which requires the entry of a bankcard number or a date of validity, the online commercial site can display a QR code on the screen, which is valid for a given period of time, so that the user's terminal has the time to acquire this code. The following part of the payment is then done in the same way as described here above. The merchant receives a notification of payment coming from his bank establishment or from a payment services provider.

This technique can also be implemented during the broadcasting of audiovisual programs on television: for example, during an advertisement spot, a QR code is displayed on the television screen at the time of display of the advertisement: this code can then be acquired by the user's terminal in order to acquire the goods or services related to this advertisement. In this case, the confirmation of payment received by the advertiser can be followed by a connection to his site so that the user can enter additional information such as a delivery address. In this case, the intermediate server (or payment service provider server) is in charge of the transmission, to the user's terminal, of a request for obtaining complementary data coming from the merchant.

This technique can also be implemented statically to enable a direct purchase of a product or service without requiring intervention by the merchant: for this purpose, it is enough to display a QR code corresponding to a product (for example a menu in a sandwich bar). The customer who wishes to obtain this menu directly carries out a recognition of the QR code. This data is decoded and then interpreted to generate the transaction to the merchant's benefit as described here above. In addition, the piece of data representing the user's identifier can be complemented by the providing of the users name so that the merchant (for example the sandwich bar) is able to know his identity. As an alternative, the user's name can also be transmitted by the payment service provider to whom the transaction is transmitted.

This type of case of use can be applied to many other situations such as payment in a car, payment for fuel at a gas pump, payment for sweets, drinks and sandwiches for example in an automatic food dispenser, data acquisition from an advertisement display, an advertisement screen in a local cinema (for example to pay for ice cream or sweets or, better still, to buy a physical item from a merchant situated next to the cinema, for example to buy a meal in the restaurant). These examples of use can correspond to situations in which the merchant is not physically present when making the transaction from the user's terminal.

In order to reinforce the security of such transactions, which may be done without a merchant's physical presence, subsequently to the obtaining of data identifying the merchant and identifying the price, the method comprises a step for sending scanned data obtained by means of the QR code, to the management server (or any other server for collecting products and services associated with merchants). These pieces of data sent by the management server can be complemented by data on location at the disposal of the terminal (for example by means of a GPS device) and by an identification of offers. The GPS data makes it possible to situate the location of the offer while the identification of the offer, which is also a piece of data of the QR code, makes it possible to know the number of the offer associated with this merchant.

In a complementary embodiment, this step coincides with the step (400) for transmitting the transaction (TF) to a transaction management server (Srv).

Upon reception of this data and prior to the implementing of the transaction, the management server verifies that the data transmitted to it effectively corresponds to a valid offer of payment for goods and/or services. In this embodiment, this requires that the merchants who wish to make offers of the type described here above should obligatorily, in order that the offers may be taken into account, declare them to a management server (or another server for collecting products and services associated with merchants) so that they are not considered to be lacking in validity. The validity of the offer can be tested through the locating (by GPS or mobile network) of the terminal. In this case, the data base also comprises an identification of the place of the offer. In order that it may be valid, the place recorded in a data base must appreciably correspond to the place in which the user's terminal is situated. The principle associated with the identification of the offer is the same. When this piece of data is taken into account, the data base comprises a price associated with the identified offer. In this case, the price obtained from the code QR is compared with the price recorded in the data base. This makes it possible to ensure that no fraud has taken place on the price.

In the event of validity of the offer, the transaction is continued as described here above. In the event of invalidity of the offer, the transaction is cancelled.

According to one particular characteristic, the invention also relates to a two-dimensional code called a QR code. According to the invention, a QR code of this kind is differentiated from the prior art QR codes by the fact that it comprises on the one hand a merchant's identifier and on the other hand an identifier pertaining to a transaction price. According to one particular characteristic depending on the embodiments, such a code also comprises a product and/or service identifier. Such a code can also comprise a locating of a sale of products or services. In an alternative version, such a code can also include an address to which the customer can get connected in order to obtain said data.

5.6. Transaction Management Server

Depending on the embodiments, the transaction management server (also called a transactional server) is considered to be a trustworthy third party in the making of the transaction.

More particularly, the transaction management server carries out the following steps:

receiving transactions from the terminals of the users (or transaction hashes depending on the embodiments, see here above);

checking the validity of the transactions received (formal validity relating to the constitution of the transaction, in compliance with the encryption keys used, etc): this step consists for example in decrypting the transaction and/or verifying that the content of this transaction corresponds to formal expectations (length of fields, mode of encoding of the data); the decryption can consist in using a public key corresponding to the user or a private key proper to the server;

optionally, checking the authorizations of payment (or delegating this check to another server). Obtaining such authorization makes it possible to ensure that the user truly has the sum necessary for payment (this check be made only for sums exceeding a certain amount of payment, for example €150 or €300) and that the data used for the payment is not stolen data (i.e. that the data has not been blocked);

carrying out or obtaining performance of debit and credit operations on bank accounts of users and merchants according to their respective identifiers;

transmitting to the user and/or to the merchant assertions of validity of transaction either when the authorizations needed for carrying out the transactions have been obtained or without these authorizations if they are not necessary.

Depending on the embodiments, the transaction management server can also take charge of other ancillary aspects. Thus for example, the transaction management server can also implement the following steps:

communicating with the merchant to give him the name of the user making the given transaction; this is done in the form of a step of transmission of the users name, for example at the same time as the transmission of the assertion of a validation of the transaction;

receiving an address from the merchant subsequently to the validation of the transaction, (for example a URL type address), with which said user must get connected in order to give the merchant complementary data;

checking the validity of the offer in a data base of valid offers accessible from the server, or with one or more servers listing valid offers, through the reception and transmission of data (implying the transmission of the merchant's identifier, the price and optionally an identifier of the offer and/or a location of the user's terminal);

transmitting data coming from the merchant to the user's terminal.

Figure 3:
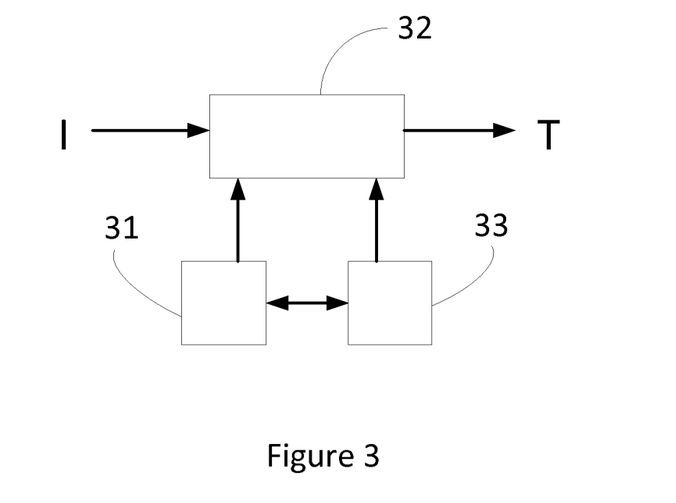
FIG. 3 describes a transaction management server.

Referring to FIG. 3, a description is provided of a management server implemented to carry out transactions from the server's viewpoint according to the method described here above.

For example, the server comprises a memory 31 constituted by a buffer memory, a processing unit 32, equipped for example with a microprocessor and driven by a computer program 33 implementing a method for building data representing the transaction.

At initialization, the code instructions of the computer program 33 are loaded for example into a memory and then executed by the processor of the processing unit 32. The processing unit 32 inputs at least one piece of data representing an identifier of a merchant and a piece of data representing a transaction amount and a user identifier. The microprocessor of the processing unit 32 implements the steps of the method for processing data representing transactions, according to the instructions of the computer program 33 to carry out a validation of transaction (checking validity, verifying authorizations, debit and credit operations, information by actors).

To this end, the server comprises, in addition to the buffer memory 31, means of communication such as network communications modules, data transmission means and possibly an encryption processor.

These means can take the form of a particular processor implemented within the server, said processor being a secured processor. According to one particular embodiment, this server implements a particular application which is responsible for carrying out transactions, this application being for example given by the manufacturer of the processor in question in order to enable the use of said processor. To this end, the processor comprises unique identification means. These unique identification means ensure the authenticity of the processor.

Besides, the server furthermore comprises means of identification and validation of the offers of products and services. These means also take the form of communications interfaces enabling the exchange of data on a communications network, means for interrogating and updating data bases and means for comparing data on location.

The invention claimed is:

1. A method of carrying out a transaction with a merchant terminal, wherein the method is implemented within a terminal of a user, and wherein the method comprises the following acts performed by the terminal of said user:

receiving a merchant's identifier by using one of the following acts through an interface of the terminal of said user:
scanning a code with a camera of the user terminal; or
receiving a message through a Bluetooth interface of the user terminal; or
receiving a message through a contactless interface of the user terminal, receiving an identification of an offer by using one of the following acts through an interface of the terminal of said user:
scanning a code with a camera of the user terminal; or
receiving a message through a Bluetooth interface of the user terminal; or
receiving a message through a contactless interface of the user terminal;

decoding the codes or the messages received to obtain a decoded merchant's identifier and the identification of the offer, said merchant identifier consisting in a merchant's particular which enable the carrying out of credit transactions towards an account of the merchant;

receiving and decoding a piece of data representing a transaction amount by the same interface as the one used for receiving the merchant's identifier;

generating a credit transaction, by using the user's terminal, for said merchant comprising:
the user terminal obtaining location data of the user terminal from a GPS device or a mobile network;
the user terminal generating a record comprising the decoded merchant's identifier, data representing the transaction amount, data representing an identifier of the user, the location data of the user terminal and the identification of the offer in a non-transitory computer-readable medium; and
the user terminal encrypting said record by using a secured processor of said terminal of said user, wherein the act of encrypting delivers said transaction; and transmitting said credit transaction from the user's terminal to a transaction management server of a third party, said transaction management server being capable of completing the transaction with the decoded merchant's identifier against a bank account of the user without providing data representing the user's bank account to a merchant or the merchant terminal when the location data of the user terminal indicated in the credit transaction corresponds to a place associated with the offer stored in a database comprising an indication of a place associated with said offer, said database being maintained by said third party.

2. The method according to claim 1, wherein generating said transaction comprises entry into the terminal of the user, by said user, of at least one piece of data representing a personal securing identifier.

3. The method according to claim 1, wherein said method comprises, subsequently to the act of transmitting, receiving by the terminal of the user a piece of data representing a validation of said transaction coming from the terminal of said merchant.

4. The method according to claim 1, wherein the act of receiving a merchant's identifier comprises a phase of pairing with the terminal of said merchant comprising obtaining a piece of data representing the merchant's identifier.

5. The method according to claim 1, wherein the act of receiving a merchant's identifier comprises scanning the code with the camera of the user terminal, which comprises reading a barcode comprising a piece of data representing the merchant's identifier.

6. The method according to claim 1, wherein the act of generating a transaction comprises:
  creating the record, which further comprises a piece of data representing an identifier of the user;
  encrypting said record by using said terminal of said user, wherein the act of encrypting delivers said transaction.

7. A user terminal for carrying out a transaction with a merchant having a merchant terminal, the user terminal comprising:
  at least one of the following interfaces: a camera; or a Bluetooth interface; or a contactless interface;
  at least one non-transitory computer-readable medium comprising instructions stored thereon;
  a processor configured by the instructions to perform acts comprising:
    receiving a merchant's identifier by using one of the following acts:
      scanning a code with the camera of the user terminal; or
      receiving a message through the Bluetooth interface of the user terminal; or
      receiving a message through the contactless interface of the user terminal;
    receiving an identification of an offer by using one of the following acts:
      scanning a code with the camera of the user terminal; or
      receiving a message through the Bluetooth interface of the user terminal; or
      receiving a message through the contactless interface of the user terminal;
    decoding the codes or the messages received to obtain a decoded merchant's identifier and the identification of an offer, said merchant identifier consisting in a merchant's particular which enable the carrying out of credit transactions towards an account of the merchant;
    receiving and decoding a piece of data representing a transaction amount by the same interface as the one used for receiving the merchant's identifier;
    generating a credit transaction, by using the user's terminal, for said merchant comprising:
      the user terminal obtaining location data of the user terminal from a GPS device of the user terminal or from a mobile network; and
      the user terminal generating a record comprising the decoded merchant's identifier, data representing the transaction amount, data representing an identifier of the user, the location data of the user terminal and the identification of the offer, in a non-transitory computer-readable medium; and
    transmitting said credit transaction from the user's terminal to a transaction management server of a third party, said credit transaction management server being capable of completing the transaction with the merchant's identifier against a bank account of the user without providing data representing the user's bank account to the merchant or the merchant's terminal when the location data of the user terminal indicated in the credit transaction corresponds to a place associated with the offer stored in a database comprising an indication of a place associated with said offer, said database being maintained by said third party; and
  a secured processor configured by the instructions to perform acts comprising:
    encrypting said record by using said terminal of said user, wherein the act of encrypting delivers said credit transaction.

8. A non-transitory computer-readable medium comprising a computer program product stored thereon and executable by a processor of a terminal of a user to carry out a transaction with a merchant having a merchant terminal, wherein the program product comprises program code instructions for executing a method for carrying out the transaction, when the instructions are executed by the processor, wherein the instructions configure the terminal of the user to perform acts comprising:
  receiving a merchant's identifier and an identification of an offer by using one of the following acts through an interface of the terminal of said user:
    scanning a code with a camera of the user terminal; or
    receiving a message through a Bluetooth interface of the user terminal; or
    receiving a message through a contactless interface of the user terminal;
  decoding the code or the message received to obtain a decoded merchant's identifier and the identification of an offer, said merchant identifier consisting in a merchant's particular which enable the carrying out of credit transactions towards an account of the merchant;
  receiving and decoding a piece of data representing a transaction amount by the same interface as the one used for receiving the merchant's identifier;
  generating a credit transaction, by using the user's terminal, for said merchant comprising:
    the user terminal obtaining location data of the user terminal from a GPS device of the user terminal or from a mobile network;
    the user terminal generating a record comprising the decoded merchant's identifier, data representing the transaction amount, data representing an identifier of the user, the location data of the user terminal and the identification of an offer in a non-transitory computer-readable medium; and
    the user terminal encrypting said record by using a secured processor of said terminal of said user, wherein the act of encrypting delivers said credit transaction; and
  transmitting said credit transaction from the user's terminal to a transaction management server of a third party, said credit transaction management server being capable of completing the transaction with the merchant's terminal against a bank account of the user without providing data representing the user's bank account to the merchant or the merchant's terminal when the location data of the user terminal indicated in the credit transaction corresponds to a place associated with the offer stored in a database comprising an indication of a place associated with said offer, said database being maintained by said third party.

9. The method according to claim 1, wherein a validity of the offer is tested by the location of the user terminal with respect to the place associated with the offer.

10. The method according to claim 1, wherein the transaction management server identifies the merchant terminal using the decoded merchant's identifier.

* * * * *